UNITED STATES PATENT OFFICE.

WILLIAM J. EWING, OF ROLAND PARK, MARYLAND, ASSIGNOR TO THE COFFEE PRODUCTS COMPANY, A CORPORATION OF MARYLAND.

COFFEE PRODUCT AND METHOD OF MAKING THE SAME.

1,229,052.      Specification of Letters Patent.      Patented June 5, 1917.

No Drawing.      Application filed December 22, 1916. Serial No. 138,328.

*To all whom it may concern:*

Be it known that I, WILLIAM J. EWING, a citizen of the United States, residing at Roland Park, in the county of Baltimore and State of Maryland, have invented certain new and useful Improvements in Coffee Products and Methods of Making the Same, of which the following is a specification.

This invention relates to a coffee extract, in dry form, and to a process of making the same.

In carrying out my invention, a measured quantity of roasted and pulverized coffee is placed within a closed vessel, associated with a water superheater, and water, in measured quantity is then admitted from the superheater to said vessel and maintained in contact with the coffee at a temperature of approximately 240°, and corresponding pressure, for a sufficient length of time to abstract the essence from the coffee. Preferably, for each pound of coffee, approximately two quarts of water are used. The time required for making the extract, with water at this temperature, varies from five to ten minutes, according to the degree to which the coffee has been roasted. As the extract is obtained in a closed vessel, all the aromatic flavors of the coffee are retained.

The liquid extract of coffee thus obtained is then separated from the residue, and the extract is then concentrated in a suitable vacuum evaporator until it is of the consistency of thin syrup when a small amount, preferably about 5%, of water-soluble starch is added to the extract and thoroughly mixed with it. This forms a semi-plastic compound which is rolled out into thin sheets and dried. When thoroughly dried the product is pulverized and put up ready for use in the form of tablets, or wafers, each containing sufficient of the extract to make one cup of coffee.

In using the product, one of the tablets or wafers, placed in a cup of hot water, dissolves at once and forms a cupful of coffee free from grounds.

After experimenting with various starches in the making of this coffee product, I have found starch from the tapioca root to be most desirable, as tablets or wafers in which it is incorporated dissolve almost instantly upon being deposited in hot water.

What I claim is:

1. The method of preparing a coffee product which comprises treating roasted pulverized coffee with hot water to form a liquid extract of coffee, concentrating the extract to a sirupy consistency, mixing a relatively small percentage of water-soluble starch with the concentrated extract and drying the resulting product.

2. The method of preparing a coffee product which comprises treating roasted pulverized coffee with super-heated water, in a closed vessel, to form a liquid extract of coffee, concentrating the extract to a sirupy consistency, mixing a relatively small percentage of water-soluble starch with the concentrated extract and drying the resulting product.

3. A dry coffee product consisting essentially of coffee extract and water-soluble starch.

4. A dry coffee product consisting essentially of coffee extract and water-soluble tapioca starch.

In testimony whereof I have affixed my signature.

WILLIAM J. EWING.